INVENTOR.
GILBERT L. HOBROUGH
BY Stanley Bialos &
Stanley Belsky
ATTORNEYS

_United States Patent Office_

3,450,833
Patented June 17, 1969

3,450,833
AUTOMATIC FOCUSING SYSTEM FOR A FLYING-SPOT SCANNER
Gilbert L. Hobrough, Woburn, Mass., assignor to Itek Corporation, Lexington, Mass., a corporation of Delaware
Filed Jan. 14, 1966, Ser. No. 520,601
Int. Cl. H04n 5/38
U.S. Cl. 178—7.2          2 Claims

ABSTRACT OF THE DISCLOSURE

This disclosure relates to an automatic focusing system useful with electro-optical scanning mechanisms such as those employed in the conversion of photographic images into video signals; and in greater particularity, the disclosure is concerned with the automatic maintenance of accurate optical and election beam focus in a high resolution, large aperture flying-spot scanning mechanism comprising a flying spot scanning assembly and a light-collection assembly operatively arranged therewith.

---

Considering for the convenience of subsequent description the composition of a typical flying-spot scanning mechanism, the scanning assembly thereof includes at least one cathode ray tube and a raster generator operative in conjunction with such tube to develop a scanning raster on the face thereof. Such raster is imaged through an appropriate objective lens onto an object to be scanned, which object may be a three-dimensional solid or an essentially two-dimensional planar object such as the image-containing emulsion of a photographic transparency. In either event, as the electron beam generated within the tube traces the scanning raster on the face thereof, the resulting light spot is transferred through or focused by the objective lens onto such object to scan the same. Evidently, the objective lens tends to focus the scanning raster imaged thereby toward one location referred to hereinafter as the "plane of focus" or "raster image plane"; and for descriptive purposes the object, whether essentially planar or solid, will be taken to define an "object plane," or a "photographic image plane" in those instances where the object is a photographic image.

The light collection assembly of such scanning mechanism comprises a photoelectric detector, such as a multiplier phototube, and the light spot from the scanning tube is directed theretoward through such objective lens and past the object to be scanned. Since such object is interposed in the light path from the flying spot scanner to the photoelectric detector, it thereby intercepts and modulates the light incident on the detector which responds thereto by producing output video signals that fluctuate in accordance with such light modulation.

In general, the amount of light available at the photoelectric detector of the light collection assembly determines the signal-to-noise ratio in the output video signals and, therefore, in part governs the quality of any image reconstructed from such output video signals. The usefulness of a flying-spot scanner is generally limited by its ability to resolve small detail in the object plane. Resolution is inversely proportioned to the area of the elemental scanning spot traversing the object, and any increase in resolution is gained at the expense of reducing the amount of light available at the photoelectric detector, which reduction in light, evidently, would result in an undesirable lessening of the signal-to-noise ratio in the output video signals.

Up to a point, any reduction in the amount of light reaching the photoelectric detector may be compensated by increasing the aperture of the optical assembly defined between the face of the scanning cathode ray tube and the photoelectric detector. However, since the depth of field of an optical assembly is reduced both by decreasing the area of the scanning spot and by increasing the optical aperture, any high resolution flying-spot scanners may be expected to have a very short depth of field as a consequence of the practicable requirement for a reduction in the area of the elemental scanning spot and for an increase in the aperture of the optical assembly. By way of example, a flying-spot scanner having a resolution of 50 lines per millimeter when used with an optical assembly having a lens aperture the f number of which is 1.0 has a depth of field of approximately ±10 microns.

With such a short depth of field, precise positioning of an object at the plane of focus of the scanning mechanism is necessary even if the object is essentially planar, such as where the object is a photographic image. Take, for example, typical photographic transparencies used in scanning mechanisms of the type described, such transparencies may be provided on rigid glass plates or flexible film base depending upon the source of the photography and the purpose thereof. Evidently, then, the thickness of the base carrying the photographic image can vary considerably, relative to such a short depth of field, since the usual glass plate is quite thick and flexible film quite thin. A further complexity is that the object to be scanned is usually much larger in area than the scanning raster and, therefore, only a small portion of the object is scanned at any instant. Accordingly, it is necessary to transport the object with respect to the scanning raster (or otherwise effect relative movement therebetween) to bring, selectively, various areas of the object in position so that the scanning raster can be imaged thereon.

Initial provision and subsequent maintenance of the object plane accurately in the plane of focus or raster image plane is difficult under the aforementioned condition of differences in the thickness of the object and the requirement for translational displacements thereof. As a consequence, the requirement for translational displacements of the object generally necessitates elaborate and heavy mechanical transport mechanisms in order to enforce a predetermined positional relationship upon the object plane during such displacements; and the differences in thickness of the object usually necessitates the provision of a variety of fixtures for supporting the objects, each fixture being intended to maintain the object plane precisely coincident with the raster image plane.

In view of the foregoing, an object, among others, of the present invention is to provide in a scanning mechanism an automatic focusing system operative to effect continuously a condition of correct optical focus and in this respect maintain the object plane accurately at the raster image plane or plane of focus of the scanning assembly of such mechanism by sensing any departure of the object plane from such accurate location of substantial coincidence thereof with the plane of focus and for effecting, in response to any such departure, adjustments of the relative position of the object plane and the plane of focus to restore and thereby continuously maintain the same in their requisite relative positions.

Another object is the provision of an automatic focusing system operative to effect continuously a condition of correct electron beam focus within the cathode ray tube and in this respect maintain the electron beam of the tube accurately focused on the screen thereof automatically and independently of variations in the values of the electrode potentials and currents supplied to the tube or to the focusing coil thereof.

Further features and characteristics of the invention, especially as concerns particular objects and advantages thereof, will become apparent from a consideration of the following specification and drawings, the latter of which illustrate specific embodiments of the invention in which.

Scanning mechanism

Figure 1:
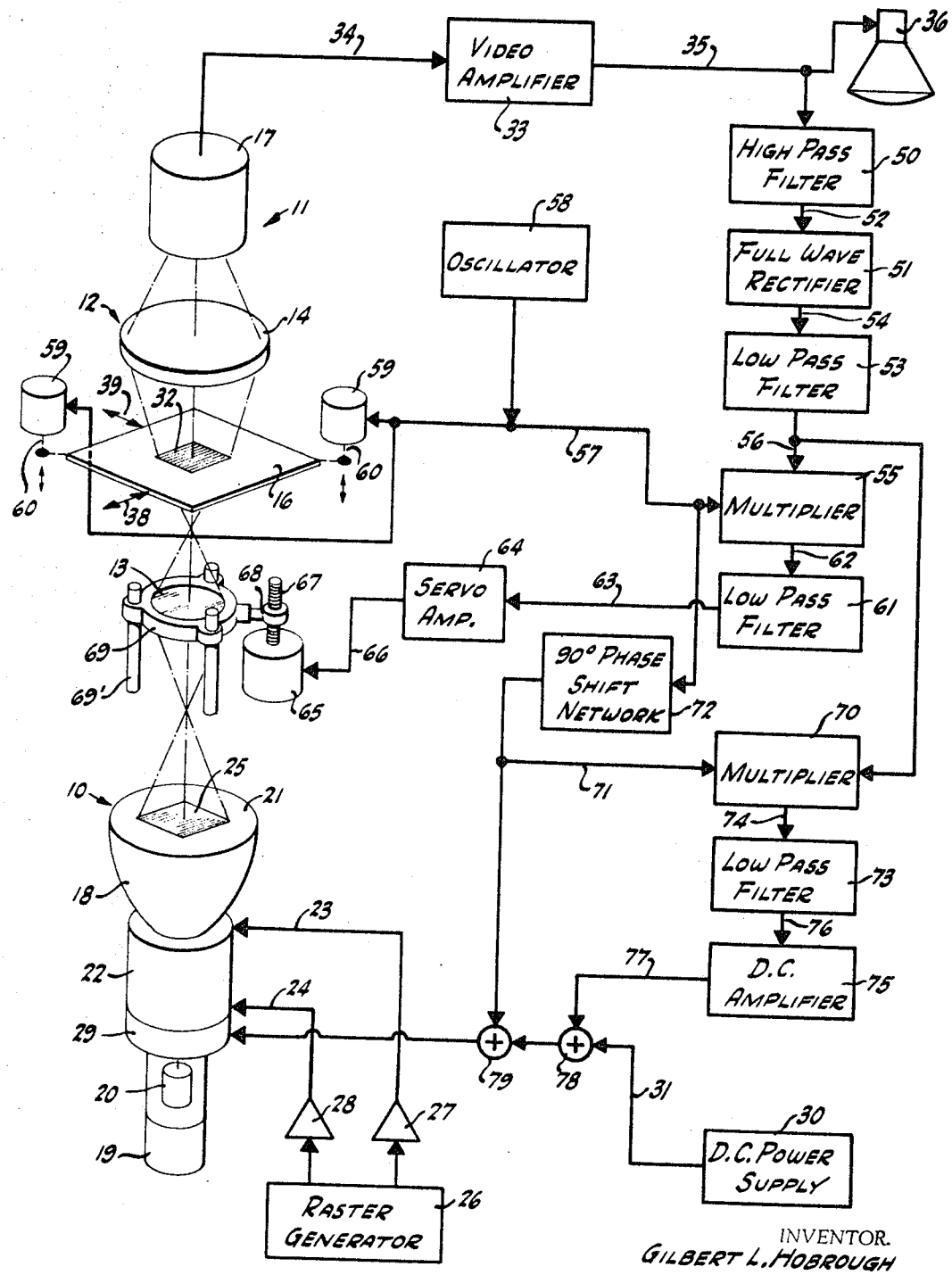
FIGURE 1 is essentially a block diagram of a scanning system embodying the invention, certain components of the system being shown diagrammatically.

The electro-optical scanning mechanism illustrated in FIGURE 1 includes a cathode ray tube scanning assembly generally denoted with the numeral 10, a light collection assembly 11, and an optical assembly 12 comprising an objective transfer lens 13 and a collector lens 14. Positioned upon a support-and-transport assembly 15 (generally indicated in FIGURE 2) is an object 16 in the form of a photographic transparency having an image-containing emulsion 16' along the underside thereof, as shown most clearly in FIGURE 2. The scanning light beam developed in the assembly 10 is transferred through the objective lens 13, object 16, and collector lens 14 toward the light collection assembly 11 and onto a photoelectric detector or pick up device 17 comprising a part thereof. The amount of light reaching such detector is dependent upon the light-modulating characteristics of the object 16, and the output video signal of the photoelectric detector 17 at any instant is dependent upon the amount of light then incident thereon. The output video signals from the detector 17 are transmitted to an appropriate utilization device, such as a viewing cathode ray tube for visual reproduction of the object on the face thereof.

The scanning assembly 10 includes a conventional cathode ray tube 18 having located in the neck 19 thereof an electron gun 20 from which a beam of electrons is projected onto the face 21 of the tube. In the usual manner, the face of the tube is coated with a fluorescent material that emits a spot of light at the point of impact thereagainst of the electron beam. Circumjacent the neck 19 of the tube forwardly of the electron gun 20 thereof is a deflection yoke 22 comprising the usual deflection coils which, when energized by deflection signals transmitted thereto via signal lines 23 and 24, are operative to produce transversely oriented magnetic fields of varying values which deflect the electron beam about the face of the tube.

The deflection signals appearing on the lines 23 and 24 are current signals which vary with time in a manner such that the point of impact of the electron beam against the coated face 21 of the cathode ray tube (and the resultant light spot) is caused to trace out in a particular pattern an area along such tube face, which area is referred to as the scanning raster and is generally of rectangular or square shape. Such raster is illustrated in FIGURE 1 and is denoted with the numeral 25. The deflection signals are developed in a raster generator 26 and are delivered to the lines 23 and 24 through amplifiers 27 and 28 respectively associated therewith.

Also circumjacent the neck 19 of the tube forwardly of the electron gun 20 therein is a focusing coil 29 operative to cause the electron beam impinging against the coated face 21 of the tube to converge sharply to a point to provide an elemental scanning spot of minimum practicable dimensions. The focusing coil 29 is energized by current flowing therethrough, and if the focus of the scanning spot is to remain sharp, the value of such current must be accurately maintained. The value of the current flow depends in part upon the value of the potentials applied to the various electrodes within the cathode ray tube 18; and the current is supplied to the focusing coil 29 from a direct current power supply 30 via a conductor 31.

The scanning raster 32 appearing on the face 21 of the cathode ray tube 18 is transferred by the objective lens 13 to a plane of focus the location of which, to a large measure, is determined by the characteristics of the lens, and which plane of focus or raster image plane must be maintained substantially coincident with the object plane—namely, the emulsion 16' of the photographic transparency 16.

Provided that such condition of substantial coincidence exists between the plane of focus of the transfer lens 13 and the emulsion of the transparency 16, the scanning raster 25 will be sharply imaged on the emulsion 16'. Any deviation, however, from such condition of coincidence will undesirably decrease the sharpness of the raster image upon the photographic transparency. In FIGURE 1, the reproduction of the scanning raster upon the photographic transparency is denoted with the numeral 32; and, evidently, as the scanning spot of the cathode ray tube 18 traces out the raster 25 on the face 21 of the tube, a corresponding raster 32, generally in reduced scale, will be imaged onto the photographic transparency 16.

A fractional part of the light imaged onto the photographic transparency by the transfer lens 13 will pass through the photograph and be gathered by the collector lens 14 which, in turn, will transmit the gathered light toward the photoelectric detector 17. The amount of light transmitted through the photographic transparency 16 will depend generally upon the density thereof, and will be modulated from point to point throughout the scanning raster in accordance with the local densities of the image area being traversed by the scanning spot.

The photoelectric detector 17 may be a multiplier phototube which is advantageously employed in detecting the modulation of low intensity light because the minute current generated by the light impinging on the photocathode of the tube is amplified by the action of a series of dynodes or secondary emission stages contained within the tube itself which thereby obviates the necessity of separate amplification stages which might otherwise be required to bring such minute current output to a useful magnitude.

The video output signals from the photoelectric detector 17 are delivered to a video amplifier 33 by a signal line 34 and the resultant amplified video signals are available at an output signal line 35 for appropriate use, as for example, in a viewing cathode ray tube 36 which recreates the photographic image being scanned usually at a location remote therefrom.

The support and transport assembly 15 ordinarily includes a frame transport element 37 adapted to support an object so that the plane thereof (i.e., object plane) is at the plane of focus of the scanning assembly and, at the same time, such support element is adapted to move the object translationally along such plane of focus in at least two normally oriented directions, as indicated by the arrows 38 and 39 in FIGURE 1. Such arrows may be taken to identify a conventional Cartesian coordinate system in which the arrow 38 represents the $x$ axis thereof and the arrow 39 the $y$ axis.

In the particular embodiment of the invention illustrated, the support and transport assembly 15, and the scanning mechanism generally, is particularly suited for use of photographic transparencies as the object to be scanned. Therefore, hereinafter the object may be referred to specifically as a photographic transparency as a matter of convenience, although the principles of the invention are applicable to objects of many types whether transparent, opaque, solid, planar, or otherwise light-modulating.

As indicated hereinbefore, if the electronic reproduction at the viewing cathode ray tube 36 of the photographic image provided by the transparency 16 is to have a high order of fidelity and be useful, the support and transport assembly 15 must be positionally oriented within very close tolerances relative to the plane of focus of the scanning assembly, and such close positioning must be maintained during transport of the photograph. That is to say, the photographic image usually will be inspected point by point and it is necessary, therefore, that the transport system be susceptible of refined positional adjustments so that each point of interest in the photographic transparency can be accurately oriented with respect to the scanning beam so as to intercept the same.

Figure 2:
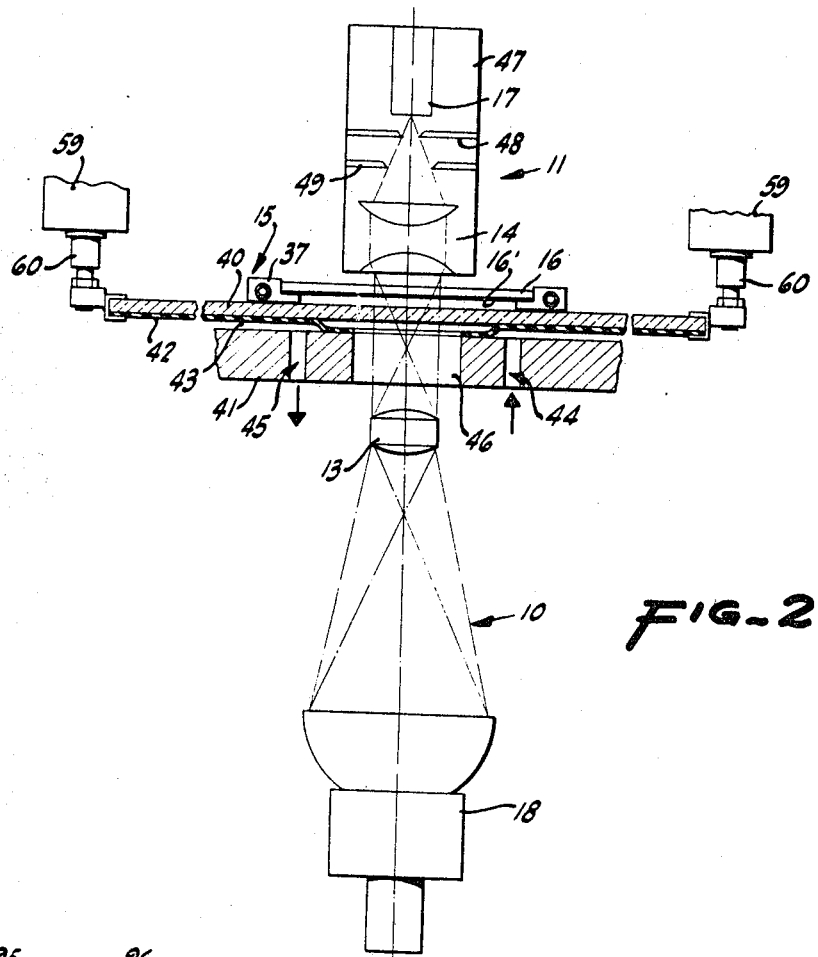
FIGURE 2 is a diagrammatic view illustrating the functional interrelation of a flying-spot scanner assembly, a light collection assembly associated therewith, and a photographic transparency interposed therebetween and positioned on a support and transport assembly.

In the illustrative mechanism shown in FIGURES 1 and 2, the support and transport assembly includes a table top or platform 40 formed of a transparent material such as glass to permit the scanning beam of the cathode ray tube 18 to pass therethrough. The table top 40 is supported with respect to a stable base 41 which is generally horizontally disposed and is formed of a relatively rigid material such as wood or metal, for example.

In the particular embodiment illustrated in FIGURE 2, a hermetic seal structure 42 is interposed between the upper surface of the base 41 and the superjacent table top 40, which seal permits movement of the table top 40 in directions generally normal to the plane thereof and relative to the base 41. The table top 40 in its operative position is spaced slightly from the upper surface of the base 41, and the base and table top 40, together with the seal structure 42, define a pressurizable chamber 43. The seal structure 42 comprises a flexible resilient membrane that may be formed of rubber, and it is sealingly secured to the base 41 at appropriate locations therealong to form such pressurizable chamber 43.

A plurality of independent and separately pressurizable chambers 43 may be provided, and each such chamber may have an inlet 44 through which air under pressure is admitted thereto and have an outlet 45 through which air is permitted to escape. In a general sense, the positional relation of the table top 40 with respect to the base 41 is determined by regulating the relative rates of the supply of pressurized air to and the escape of air from each such chamber 43; and in a particular sense, such relative rates of supply and escape can be regulated by controlling the escape of air as will be described hereinafter in explanation of the structure shown in FIGURE 3. As shown in FIGURE 2, the base 41 has an opening 46 formed therethrough in alignment with the scanning assembly 10 and light collection assembly 11 so that the scanning beam from the cathode ray tube 18 can be transmitted through such opening, through the table top 40 and photographic transparency 16 disposed thereabove, and to the multiplier phototube 17.

The frame transport element 37 is supported by the table top 40, wherefore the location of the transport element and photographic transparency carried thereby along the optical axis (that is, vertically as viewed in FIGURE 2) is determined by the table top 40. Additionally, and as indicated hereinbefore, the frame transport element 37 is displaceable along the plane of the table top 40 in the $x$ and $y$ directions 38 and 39; and for this purpose, track and rail structure (not shown) may be included in the assembly to define the coordinate paths of displacement of the frame element. Since the details of such transport are not germane to the present invention, they are excluded for purposes of simplifying the present disclosure. However, complete details of a support and transport system which can be used herein may be found in the U.S. Patent 3,267,798 in the name of G. L. Hobrough et al.

The photoelectric detector 17 usually will be enclosed within a light shield 47 to exclude, so far as necessary, ambient light. Also, fixed aperture structures 48 and 49 may be arranged with the detector 17 to control the amount of stray light incident thereon, and the collector lens 14 may comprise a pair of convex lenses with the arcuate surface thereof disposed in facing relation, as shown in FIGURE 2.

For the most part, the components so far described may be conventional, and by way of illustrative example, the cathode ray tube 18 may be a Dumont 5CKP16; the photoelectric detector 17 may be an RCA 6655–A multiplier phototube; the raster generator 26 may be of the type disclosed in the application of Gilbert L. Hobrough, Ser. No. 394,424, filed Sept. 4, 1964; the support and transport system may be of the type disclosed in the aforementioned Patent 3,267,798 issued to Gilbert L. Hobrough et al.; and the transfer lens 13 can be any high quality cathode ray tube transfer lens such as an Elgeet lens, F1.9–3″ focal length, oscilo novitor; the associated circuitry and components such as the amplifiers 27 and 28, DC power supply 30 and video amplifier 33 can be conventional elements well known in the art.

Automatic focusing system, optical

Referring to FIGURE 1, the automatic focusing system for sensing any departure of the photographic image plane (i.e., the object plane) from a condition of accurate focus or substantial coincidence with the raster image plane or plane of focus, and for correctively restoring accurate focus in response to such departures, is in the nature of a servo system and is responsive to signals appearing on the output line 35 of the video amplifier 33. The system includes a high-pass filter 50 connected with the signal line 35 so as to receive therefrom the amplified video output signals from the amplifier 33. The output of the high-pass filter 50 is connected to the input of a full-wave rectifier 51 by a conductor 52, and the output of the rectifier is delivered to a low-pass filter 53 via a signal line 54.

The output of the low-pass filter 53 constitutes one of the signal inputs to a multiplier 55, and the filter is connected thereto by a signal line 56. The other input to the multiplier 55 is transmitted thereto by a signal line 57 which is connected to the output of a low frequency oscillator 58. The oscillator output is also connected to a perturbation or vibration-exciting structure 59 which in the form shown, constitutes solenoid apparatus. Two solenoids 59 are illustrated for purposes of depicting mechanical symmetry, and the plunger 60 of each solenoid is coupled with the photographic transparency 16 (as through the table top 40, as shown in FIGURE 2) so as to impart small amplitude oscillations or vibratory displacements thereto along the optical axis of the scanning system. Such vibratory displacements of the photographic transparency 16 correspond in frequency to that of the oscillator 58, and the use of a plurality of symmetrically related solenoids effectively limits the vibratory displacement of the transparency to motion along such optical axis. Other means may be employed for this purpose, one of which will be described hereinafter.

Output signals from the multiplier 55 are delivered to a low-pass filter 61 by a signal line 62, and the output of such low-pass filter is delivered by a signal line 63 to a servo amplifier 64. The amplifier output is transmitted to a servo motor 65 by a signal line 66 to effect responsive energization of the motor and thereby correctively change the position along the optical axis of the transfer lens 13, to which the motor is operatively connected, so as to maintain the plane of focus of the scanning assembly accurately along the emulsion 16' of the photographic transparency 16.

In the exemplary form shown, such interconnection of the motor 65 with the transfer lens 13 constitutes a threaded shaft or lead screw 67 forming an extension of or otherwise connected to the shaft of the motor 65 so as to be rotated thereby, and a nut 68 operatively engaged by the screw 67 and secured to the transfer lens 13 as by means of a bracket 69. Quite evidently, the motor 65 and threaded shaft 67 will be fixedly mounted to prevent translational movements thereof and, as a result, rotational displacements of the screw will cause the nut 68 and transfer lens 13 to be displaced axially with respect thereto. Motion of the lens 13 should be restricted to displacements along the optical axis, and for this purpose guide structures 69' may be arranged with the bracket 69, as shown.

The oscillator 58 is operative to generate a sinusoidal signal having a frequency which may be somewhat lower than the frame repetition rate of the scanning raster which, for example, may have a rate of 30 frames per second with each frame comprising an interlace of two fields. Typically, the frequency of the oscillator 58 may be in the order of 10 cycles per second. Thus, the cyclic output of the oscillator 58 being delivered to the solenoids 59 will cause the same to impart vibratory displacements to the photographic transparency 16 at the frequency of about 10 cycles per second. The amplitude of such vibratory displacements is held to a relatively small percentage of the depth of field of the optical assembly, and such displacements do not, therefore, cause noticeable degradation of the electronic reproduction of such image at the viewing cathode ray tube 36. Restricting the amplitude of the vibratory displacements to about 20% of the depth of field imparts adequate motion to the film transparency without seriously degrading the electronic image.

The high-pass filter 50 is operative to select from the video signals delivered thereto from the amplifier 33 those signals approximating the upper octave of the video spectrum, and the filter transmits the selected signals in such upper octave to the full-wave rectifier 51. Any defocusing of the image (i.e., lack of coincidence of the object plane and raster image plane) changes the character of the video signals derived from the photoelectric detector 17 by reducing the high frequency components thereof. Therefore, defocusing of the image which occurs as a consequence of the vibratory displacements enforced on the photographic transparency 16 reduces the high frequency components in the video signal with the result that the periodicity of such defocusing introduces a small modulation of cyclically repetitive character into the signal delivered by the high-pass filter 50 to the full-wave rectifier 51, and such modulation will represent the cyclic deviation of the photographic transparency from a condition of accurate focus as such deviation is induced by the solenoid 59 in response to the signal output of the oscillator 58.

The full-wave rectifier 51 delivers to the low-pass filter 53 a rectified signal, the average value of which is proportional to the amplitude of the output signal from the high-pass filter 50. The low-pass filter 53 is effective to attenuate video frequency components present in the rectified signal delivered thereto by the full-wave rectifier 51, and the signal delivered by the low-pass filter 53 to the multiplier 55 has a value proportional to the amplitude of the video signal present on the output signal line 52 from the high-pass filter 50. Accordingly, the full-wave rectifier 51 and the low-pass filter 53 are operative together to demodulate the signal transmitted to the rectifier from the high-pass filter 50 and to provide on the input signal line 56 to the multiplier 55, a signal fluctuating at the frequency of the oscillator 58; namely, a frequency of about 10 cycles per second in accordance with the aforementioned exemplary frequency of operation.

Consideration will now be given to the nature of the signals under different conditions of focus, and it will be assumed that initially the photographic transparency 16 is not in accurate focus with the scanning raster and, in particular, that the photographic emulsion 16' (i.e., the object plane) lies somewhat above the plane of focus of the scanning raster. Also, it will be assumed that a positive signal from the oscillator 58 imparts an upward displacement to the transparency 16 and, correspondingly, that a negative signal from the oscillator imparts a downward displacement to the transparency. Under these conditions, it will be apparent that when the transparency 16 is located above the plane of focus, a positive signal voltage from the oscillator 58 will result in the solenoids 59 displacing the transparency upwardly which will further reduce the accuracy of the focus. Conversely, when the output signal voltage from the oscillator is negative, the resultant displacement of the photographic transparency imparted thereto by the solenoids 59 will be downwardly, thereby improving the accuracy of the focus.

Since the amplitude of the high frequency video signals present on the signal line 52 defining the input to the full-wave rectifier 51 is a function of the accuracy of the focus, and because the amplitude of the signal from the low-pass filter 53 is derived from the amplitude of the input signals to the rectifier, the output signal on the line 56 from the low-pass filter 53 will fluctuate and become, for example, more positive when the accuracy of the focus is improved and more negative when the accuracy of the focus is reduced. It can be seen, therefore, that under the described conditions, the signal present on the line 56 will vary cyclicly in response to the vibratory motion imparted to the photographic transparency 16 and will be more positive when the signal output of the oscillator 58 is negative (corresponding to a downward motion of the transparency 16 to improve focus), and will become more negative when the output from the oscillator is positive (corresponding to an upward movement of the transparency 16 to reduce focus).

If the photographic transparency 16 lies somewhat below the plane of focus, an upward displacement of the transparency in response to the action of the solenoids 59, upon receipt of a positive signal voltage from the oscillator 58, will improve the accuracy of focus; and a downward displacement of the transparency upon receipt by the solenoids of a negative signal voltage from the oscillator will reduce the accuracy of focus. It can be seen, therefore, that under the condition in which the photographic transparency lies below the plane of focus, the phase relationship between the oscillator voltage present on the line 57 and the low-pass filter output signal voltage present on the line 56 will be reversed with respect to the prior described condition in which the photographic transparency lies above the plane of focus.

Summarizing, when the photographic transparency 16 (i.e., the emulsion 16' thereof or photographic image plane) lies above the plane of focus, the respective signals on the line 57 from the oscillator 58 and line 56 from the low-pass filter 53 will have an opposite phase relation (substantially 180° out of phase); and when the photographic transparency lies below the plane of focus, the respective signals on the line 57 from the oscillator 58 and line 56 from the low-pass filter 53 will have a substantially coincident phase relation. When a condition of accurate focus exists, then both upward and downward movements of the transparency 16 induced by positive and negative excursions of the oscillator output signal voltage will reduce the accuracy of the focus very slightly.

It may be concluded, therefore, that under this latter condition of accurate focus, the signal appearing on the line 56, which signal may be referred to hereinafter as the "focus quality" signal, will be maximum when the oscillator output signal on the line 57 is zero, representing a neutral perturbation or vibratory position of the transparency, and will decrease to more negative values when the oscillator output signal on the line 57 becomes either positive or negative. As a consequence, the focus quality signal appearing on the line 56 will fluctuate at a fundamental frequency equal to twice the frequency of the oscillator 58, or using the aforementioned example in which the frequency of the oscillator is 10 cycles per second, the fluctuation frequency of the signal on the line 56 will now be 20 cycles per second and it will not contain a 10 cycle frequency component.

As made evident hereinbefore, the multiplier 55 receives as inputs thereto an oscillatory signal from the oscillator 58 and a fluctuating signal constituting the focus quality signal from the low-pass filter 53. The multiplier 55 serves to correlate such two signal inputs thereto and deliver to the output line 62 a signal proportional to the product of the instantaneous values of such input signals. Accordingly, when the input factor signals to the multiplier are in phase, or have a substantially coincidence phase relationship, the product output signal delivered to the line 62 necessarily has only positive values because the two input factor signals to the multiplier will have the same sign. Conversely, when the input factor signals to the multiplier are substantially 180° out of phase, the product output signal delivered to the line 62 necessary has only negative values because the two input factor signals to the multiplier will be of opposite sign. Whenever either of the input factor signals to the multiplier has a zero value, the product output signal on the line 62 must also be zero.

It is apparent, then, that the output signal from the multiplier appearing on the line 62 will fluctuate between zero and a maximum positive value when the input signals appearing on the lines 56 and 57 are in phase, which corresponds to the photographic transparency lying below the plane of focus; and that the output signal from the multiplier appearing on the line 62 will fluctuate between zero and a maximum negative value when the input signals appearing on lines 56 and 57 are in phase opposition, which corresponds to the photographic transparency lying above the plane of focus. When the photographic transparency is precisely positioned at the plane of focus, the output signal from the multiplier appearing on the line 62 will fluctuate between positive and negative values and will have a zero direct current component.

The low-pass filter 61 is operative to smooth the product output signal from the multiplier appearing on the line 62 so as to make present on the line 63 a signal representative of any direct current component present in the product output signal from the multiplier. Thus, whenever the photographic transparency lies above the plane of focus, the signal appearing on the line 63 will be negative; when the photographic transparency lies below the plane of focus, the signal appearing on the line 63 will be positive; and when the photographic transparency is precisely located at the plane of focus, the signal appearing on the line 63 will be zero. For convenient reference, such signal appearing on the line 63 may be referred to hereinafter as the "focus error signal."

The sign and magnitude of such focus error signal appearing on the line 63 is evidently a function of the direction and magnitude of any positional deviation between the photographic transparency and the plane of focus of the transfer lens 13; and such signal is delivered to the amplifier 64 which is operative to transmit an amplified replica of the focus error signal via signal line 66 to the servo motor 65. The servo motor is responsive to the magnitude and sign of the input signal thereto to drive the lead screw 67 in the appropriate angular direction to effect a displacement of the transfer lens 13 along the optical axis of the system to change correctively the plane of focus toward a condition of coincidence thereof with the photographic transparency (i.e., photographic image plane). As explained before, the guide structure 69–69' maintains the transfer lens 13 in a rather precise horizontal disposition during adjustable displacements thereof and confines such displacements to movements the direction of which is essentially parallel with the optical axis of the system.

As stated, the direction of rotation of the servo motor 65 is determined by the polarity of the focus error signal delivered thereto on the line 66, and the motor is connected so as to displace the transfer lens 13 in a direction tending to correct any departures from coincidence of the photographic image plane and the plane of focus of the scanning raster. Therefore, a closed loop system is provided in which the position of the photographic image plane of the transparency 16 relative to the plane of focus of the scanning raster is sensed, and any discrepancies in such relative position representative of inaccurate focus cause corrective displacements to be imparted to the transfer lens in a direction tending to restore accurate focus.

The response time of such closed loop system is limited by the frequency of the oscillator 58; and with an oscillator frequency of 10 cycles per second, the response time of the system to correct deviations from a condition of coincidence as between the photographic image plane and plane of focus of the scanning raster may be approximately 300 to 500 milliseconds. Clearly, therefore, the system will respond with sufficient rapidity to accommodate departures from the precise focus resulting from the usually encountered disturbances such as irregularities or discrepancies in the support and transport assembly that cause departures of the photographic image plane from the plane of focus during transport of the transparency.

*Automatic focussing system, electron beam*

The focus quality signal input to the multiplier 55 is also delivered from the line 56 to a multiplier 70 and constitutes one of the input signals thereto. The other input signal to the multiplier 70 is delivered via a signal line 71 and constitutes the signal output of a phase shift circuit 72, the input to which is received from the signal line 57 and constitutes the output signal voltage of the oscillator 58. The output signal from the multiplier 70 is transmitted to a low-pass filter 73 on a signal line 74, and the output of the low-pass filter is fed to a direct current amplifier 75 on a signal line 76. The output signal from the amplifier 75 is delivered to the aforementioned conductor 31 by a conductor 77, and the connection of such conductor 77 with the line 31 is indicated as a summing point 78. The output of the phase shift circuit 72, as well as being fed to the multiplier 70, is delivered to the conductor 31, and the connection of the conductor 71 from the phase shift network with the line 31 is indicated as a summing point 79.

Such components 70, 72, 73 and 75 together comprise a system for sensing the sharpness of the electron beam transmitted from the electron gun 20 of the cathode ray tube 18 to the face 21 thereof, and for regulatively adjusting the current flow through the focusing coil 29 so as to achieve maximum sharpness of the electron beam and, correspondingly, a minimum scanning spot size. In accomplishing this result, the phase shift network 72 is operative to deliver to the multiplier 70 a replica, phase shifted by 90°, of the output signal from the oscillator 58, and such phase-shifted signal replica is also applied directly to the focusing coil 29 because of the connection of the signal line 71 with the conductor 31 at the summing point 79. Consequently, the composite signal delivered to the focusing coil 29 will include, in addition to the focusing current from the direct current power supply 30, a signal fluctuating at approximately 10 cycles per second, which signal is in phase quadrature with the signal applied to the solenoid 59. Such cyclically fluctuating signal delivered to the focusing coil 29 will produce cyclic variation in the size of the scanning spot because the effective focal length of the focusing coil will be varied cyclically by the fluctuating signal.

Such fluctuations in the size of the scanning spot will correspondingly change the resolution or sharpness of focus of the entire scanning mechanism in a manner completely analogous to the changes enforced thereon by the vibratory displacements of the photographic transparency 16 imparted thereto by the solenoids 59. This repetitive change in the resolution of the scanning mechanism caused by the cyclic fluctuations in the size of the scanning spot will modulate the high frequency components in the output video signal present on the line 35, which modulation, in the same manner as described hereinbefore, will produce a focus quality signal on the line 56 through the function of the high-pass filter 50, full-wave rectifier 51, and low-pass filter 53, all as previously described.

Accordingly, the focus quality signal appearing on the line 56 will contain information respecting both the accuracy of the optical focus (relative position of the object plane and plane of focus or image raster plane) and the electronic focus (sharpness of the scanning spot). As a result of the action of the phase shift network 72, the fluctuating signal component present on the line 56 representing optical focus will be in phase quadrature with the fluctuating component of the signal representing electronic focus. Since the multipliers 55 and 70 do not deliver a signal having a direct current component from the multiplication of input signals in phase quadrature, the signal from the multiplier 55 appearing on the line 62 will not contain a direct current component representative of the quality of focus of the electron beam since the signal component on the line 56 carrying such information is in phase quadrature with the oscillator signal delivered to the multiplier 55 via the signal line 57.

Similarly, the multiplier 70 will deliver only an electron beam focus quality signal since the fluctuating component on the signal line 56 representing electron beam focus error is in phase quadrature with the output signal of the oscillator 58 present on the line 56 and, therefore, is in phase coincidence with the 90° phase-shifted replica thereof delivered to the multiplier 70 by the signal line 71. Further, since the fluctuating components of the signal on the line 70 representing error in the optical focus are in phase coincidence with the oscillator output signal present on the line 57, such components will necessarily be in phase quadrature with the signal on the line 71 and will not produce an error signal on the line 74 defining the output of the multiplier 70.

The low-pass filter 73 is operative to smooth the multiplier output signal on the line 74 so as to make present on the line 76 a direct current signal (which may be referred to hereinafter as the "electron beam focus error signal"), the polarity and magnitude of which respectively represent the direction and amplitude of any error in the focus of the electron beam. The direct current amplifier 75 amplifies such direct current error signal and applies a corrective voltage, via the signal line 77, to the summing point 78 and, therefore, to the focusing coil 29. Such correction voltage applied to the summing point 78 has a direct current potential and is added algebraically to the output from the power supply 30. Such correction voltage is therefore effective to alter or vary the convergence enforced on the electron beam by the focusing coil in a direction to reduce electron focus error.

*Mechanical variation*

Figure 3:
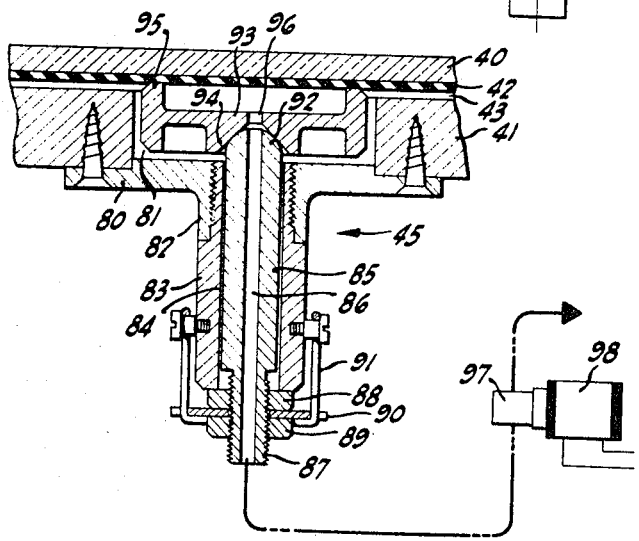
FIGURE 3 is a broken vertical sectional view illustrating a modification in the mechanism.

As indicated hereinbefore, perturbation or vibratory displacements may be imparted to the object 16 in a variety of ways, and an alternative to the solenoid mechanism shown in FIGURES 1 and 2 is illustrated in FIGURE 3. Referring thereto, the outlet 45 (which is shown generally or diagrammatically in FIGURE 2) is seen to comprise a fitting 80 secured to the base 41, as by means of screws as shown; and the fitting defines the lower end closure for a large opening 81 in the base 41. The fitting has an integral depending collar 82 providing a threaded bore therethrough centrally aligned with the opening 81 in the base, and threadedly received within such collar is an elongated sleeve 83 having a longitudinally extending passage 84 therein also centrally aligned with the opening 81. Slidably mounted within the passage 84 in sealing engagement therewith is a valve stem 85 having a flow passage 86 extending therethrough, and the lower end portion 87 of the valve stem is threaded so as to receive a pair of nuts 88 and 89 thereon. Interposed between the nuts is a bracket 90 that forms a seat or point of connection for the lower end of a spring structure 91—the upper end portions of which are secured to the sleeve 83 as by means of the screws shown.

The spring structure 91 is a tension spring operative to bias the valve stem 85 upwardly, and in the particular form shown, the spring structure is a length of elastic such as rubber. The uppermost position of the stem 85 (for the contemporary adjustment thereof) is illustrated in FIGURE 3 and is defined by abutment of the nut 88 with the lower end of the sleeve 83. Evidently, the upper limit of displacement of the valve stem 85 within the sleeve 83 can be varied by moving the nuts 88 and 89 either upwardly or downwardly along the threaded lower end 87 of the valve stem 85; and if the nuts are moved upwardly therealong, the maximum upward displacement of the valve stem within the sleeve is decreased, and vice versa.

At its upper end, the valve stem 85 is rounded as shown at 92, and has a generally hemispherical curvature adapted to seat thereon a valve element 93 provided with a centrally disposed frustoconical opening 94 that receives such upper end 92 therein, whereupon the valve element is capable of slight angular displacements relative to the valve stem 85 without destroying the essentially fluid-tight seal defined along the line contact between the upper end 92 of the stem and the frustoconical opening 94. Such permissible angular displacements of the valve element 93 enable the plane defined by the upper surface of the annular lip 95 to conform to the disposition of the planar table top or platform 40.

The valve element 93 has a flow port 96 therethrough communicating with the flow passage 86 in the valve stem and adapted to establish communication between such flow passage and the pressurizable chamber 43 to permit the escape of fluid therefrom. The valve element 93 is annular and the upwardly extending lip 95 thereof is substantially continuous and is adapted to sealingly support the platform 40 thereon; and in the specific structure shown, sealing engagement between the annular lip 95 and the platform 40 is provided by the resilient diaphragm 42 interposed therebetween.

Arranged with the exhaust outlet 45 is a vibration-exciting structure operative to impart vibratory displacements to the table top or platform 40 and, therefore, to the photographic transparency 16 supported thereby. Accordingly, such structure performs the same function as the solenoids 59 heretofore described. In terms of specific mechanism, the vibration-exciting structure arranged with the outlet 45 constitutes a valve 97 controlled by a solenoid 98.

The solenoid-controlled valve unit 97, 98 may be conventional, and the valve 97 thereof is connected in the flow passage 86, through which air escapes to atmosphere, so as to selectively alter the flow of air through such passage. The solenoid 98 is connected to the oscillator 58 so as to be energized thereby (in the same manner as the solenoids 59) and, accordingly, the valve 97 will be disturbed at the frequency of the oscillator 58. Corresponding to the example heretofore set forth, the frequency of such disturbance will be about 10 cycles per second.

As indicated hereinbefore, the support and transport assembly may be of the type disclosed in the copending patent application of Gilbert L. Hobrough and George A. Wood, Ser. No. 313,882, and reference may be made thereto for further details of the assembly and for an explicit discussion of the mode and manner of operation thereof. For convenience herein, however, a summary of the operating characteristics of the exhaust system 45 will now be set forth.

Each inlet 44 is connected to a source of pressurized fluid which, in the usual case, will be a gaseous fluid such as compressed air. Consequently, each chamber 43 is pressurized and the pressure therein is operative between the upper surface of the base 41 and the lower surface of the platform 40 (that is, the diaphragm 42) to develop a pressure force of sufficient magnitude to elevate the platform 40 slightly above the base 41, as shown in FIGURES 2 and 3, whereupon the tabletop is floatingly supported as a substantially weightless member. The value of the pressure developed within each of the chambers 43 to effect such floating support of the platform 40 depends upon the weight thereof and the magnitude of any external loads applied thereto in a downward direction; and by way of specific example, in one installation the pressure is in the order of 0.02 p.s.i.g. and is supplied from a source delivering approximately 2.0 p.s.i.g.

Not only is it desired to support the tabletop 40 on a cushion of pressurized gas, but it is also desired to establish and to maintain accurately the position of the tabletop so that the photographic transparency 16 supported thereby is located at the plane of focus of the scanning assembly; and therefore the tabletop 40 serves as the reference plane for the scanning mechanism. Practicably, this imposes the requirement that the tabletop 40 have a predetermined positional relation with respect to the base 41, and such positional relation is determined by regulating the relative rates of the supply of pressurized gas to and the escape of gas from each chamber 43. In the structural composition illustrated, control over the relative rates of supply and escape of gas is maintained by controlling the rate of escape through each exhaust valve 45.

More particularly, the platform or tabletop 40 is shown in the upper position thereof in which it is spaced from the base 41. In this position, the upper annular edge portion 95 of each valve element 93 is sealingly engaged by the membrane 42 and tabletop 40 and there is essentially no escape of gas outwardly through the exhaust passage 86 in the valve stem. It may be noted that there is no material escape of gas between the outer surface of the valve stem 85 and circumjacent surface of the sleeve 83 because of the close fit provided therebetween, the length of these elements and the relatively low pressures involved.

As the pressure within each chamber 43 tends to rise slightly above the value thereof required to maintain the tabletop in such upper position, which tendency results from the continuous supply of gas to the chamber through the inlet 44 associated therewith, the tabletop 40 begins to rise slightly relative to the base 41. Any such tendency toward upward displacement of the tabletop 40 destroys the sealing engagement of the lip 95 with the membrane 42 so that pressure fluid within the chamber 43 flows over such lip, into the interior of the valve element 93, and outwardly therefrom through the port 96 and exhaust passage 86 in the stem 85. The pressure within the chamber 43 is accordingly decreased, and the tabletop 40 settles downwardly the very small distance required to terminate such escape of gas.

Thus, ordinarily the tabletop 40 oscillates almost imperceptibly between the normal upper position thereof shown in FIGURES 2 and 3 and a slightly higher position at which the escape of gas over the lip 95 of the valve element is initiated. Quite apparently, the extent of such oscillatory displacements of the tabletop 40 are held to a very small magnitude by making the cross sectional area of the exhaust outlet defined by the passage 86, port 96 and surface area of the annular lip 95 many times greater than the cross sectional area of the inlet opening defined by the inlet 44 or, more particularly, by the smallest cross sectional area in the inlet system (a metering passage provided therealong, for example).

The exact elevation of the tabletop 40 may be selectively varied by changing the maximum permissable upward displacement of the valve stem 85 and valve element 93 carried thereby. More particularly, when the chamber 43 is pressurized, the tabletop 50 is displaced upwardly, as described, and the spring structure 91 is sufficiently strong to cause the valve stem 85 and valve element 93 to be displaced upwardly (i.e., to follow the tabletop) against the gravitational force tending to hold the same downwardly. Upward movement of the valve stem under the influence of the spring structure 91 continues until the nut 88 abuts the sleeve 83; and once such abutment is established, further upward displacement of the valve element and valve stem is positively prevented. The tabletop 40 cannot move upwardly beyond the upper position shown without permitting the escape of gas from the chamber 43; and, therefore, the maximum upward displacement of the valve structure is evidently effective to define the operating position of the tabletop.

So long as pressure fluid is admitted continuously through the inlet 44 and is permitted to escape freely through the passage 86 whenever the platform 40 tends to be elevated slightly above the annular lip 95 of the valve element, the tabletop 40 remains essentially in its uppermost position, as shown, and any tendency to deviate therefrom is very slight. The valve 97, however, is intended to cyclically disturb the free flow of gas through the passage 86 at the frequency of excitation of the solenoid 98 as such frequency is determined by the oscillator 58.

More especially, if the valve 97 is displaced by the solenoid 98 toward its closed position, the free flow of air through the passage 86 will be restricted in which event the pressure within the chamber 93 will tend to rise. Any such increase in the pressure within the chamber 43 will result in an increase in the magnitude of the pressure force acting upwardly against the tabletop 40, whereupon the tabletop will be elevated slightly. As soon as the valve 97 is returned to its prior position, a greater quantity of air will escape through the passage 86 with the result that the pressure within the chamber 43 will decrease and the tabletop 40 will descend toward sealing engagement with the annular lip 95. This cyclically repetitive displacement of the valve 97 alternately toward the closed and open positions thereof will impart corresponding vibratory displacements to the tabletop at the perturbation frequency of the oscillator 58.

As explained heretofore, the magnitude of such vibratory displacements is restricted to about 20% of the depth of field of the scanning mechanism. Also, the vibratory displacements of the tabletop 40, and therefore of the photographic transparency 16 supported thereon, will be along an axis substantially coincident with the optical axis of the scanning mechanism because the pressure variation within the chamber 43 caused by the valve 97 is uniformly distributed along the tabletop 40.

Thus, in both embodiments of the invention, a cyclically repetitive variation in optical focus is enforced upon the scanning mechanism by imparting a controlled vibratory displacement to the object and, therefore, to the object plane which, when the object is a photographic transparency, is ordinarily the image-containing emulsion thereof. This cyclically repetitive variation is usefully employed in automatically and continuously correcting random deviations in the optical focus of the scanning mechanism irrespective of their origin which, for example, may arise from changes in the thickness of the objects being scanned or from translational displacements thereof. Additionally, cyclically repetitive variation in electronic focus is enforced upon the scanning mechanism by delivering a phase-shifted replica of the oscillator signal to the focus coil of the scanning tube.

Thus, in both embodiments of the invention, a cyclically repetitive variation in optical focus is enforced upon the scanning mechanism by imparting a controlled vibratory displacement to the object and, therefore, to the object plane which, when the object is a photographic transparency, is ordinarily the image-containing emulsion thereof. This cyclically repetitive variation is usefully employed in automatically and continuously correcting random deviations in the optical focus of the scanning mechanism irrespective of their origin which, for example, may arise from changes in the thickness of the objects being scanned or from translational displacements thereof. Additionally, cyclically repetitive variation in electronic focus is enforced upon the scanning mechanism by delivering a phase-shifted replica of the oscillator signal to the focus coil of the scanning tube, and such variation is usefully employed to continuously maintain the electronic focus or electron beam focus of the flying spot scanning tube 18 at optimum sharpness, as explained heretofore.

The automatic focusing system is directly applicable to multiple-assembly scanning mechanisms such as the two-scanner, two-light-collection mechanism disclosed in the copending patent application of Gilbert L. Hobrough, Ser. No. 394,502, filed Sept. 4, 1964; and it may be noted that all of the components comprised by both the automic optical focusing system and by the electron beam focusing system may be completely conventional, and for this reason are not depicted in terms of their circuit details.

While in the foregoing specification embodiments of the invention have been set forth in considerable detail for purposes of making a complete disclosure thereof, it will be appreciated by those skilled in the art that numerous changes may be made in such details without departing from the spirit and principles of the invention.

What is claimed is:

1. In a method of correcting random deviations in both the electronic focus of a flying-spot scanning assembly including a cathode ray tube and the optical focus of the raster image plane of such flying-spot scanning assembly with the object plane of an object interposed in the path of the scanning light transmitted from such scanning assembly to a light collection assembly operative to produce video signals representative of such object and variable in character in accordance with the condition of the accuracy of the electronic focus and of the optical focus, the steps of developing a cyclically variable perturbation signal, introducing cyclic variations in the optical focus of said raster image plane and object plane to modulate cyclically such video signals, introducing cyclic variations in the electronic focus of said raster image plane and object plane to modulate cyclically such video signals, introducing cyclic variations in the electronic focus of the electron beam of said cathode ray tube on the screen thereof to modulate cyclically such video signals, producing from such video signals a focus quality signal representative of such cyclic modulations of the video signals together with any random variations resulting from random deviations in the optical focus and in the electronic focus, developing from said perturbation signal and focus quality signal an optical focus error signal indicative of any such random deviations in the optical focus, developing from said perturbation signal and focus quality signal an electronic focus error signal indicative of any such random deviations in the electronic focus, and correctively adjusting both the optical focus and electronic focus toward conditions of accurate focus in response to the respective focus error signals.

2. In a method of correcting deviations in focus in an electro-optical flying-spot scanning mechanism including a scanning assembly and a light collection assembly and in which the scanning light traverses an object in being transmitted from the scanning assembly to the light collection assembly which produces video signals in accordance with the light-modulating characteristics of such object and which video signals vary in character in accordance with whether the focus of the scanning mechanism is accurate or whether there is a deviation from accurate focus, the steps of introducing a cyclically repetitive variation in focus of the scanning mechanism to modulate such video signals, producing from any variation in such video signals representative of deviation from focus and from such modulation of the video signals a focus error signal representative of any such deviation in focus, and correctively adjusting the focus of the scanning mechanism toward a condition of accurate focus in response to the focus error signal, the aforementioned focus constituting both the optical focus between the raster image plane defined by said scanning mechanism and object plane defined by such object and the electron beam focus of the electron beam on the face of the cathode ray tube, and the step of introducing a cyclically repetitive variation in the optical focus of such scanning mechanism comprises introducing an axial displacement between the raster image plane and the object plane defined by such object, and the step of introducing a cyclically repetitive variation in the focus also comprises the step of introducing an axial displacement between the focus of the electron beam and the screen of such cathode ray tube.

References Cited

UNITED STATES PATENTS

| | | |
|---|---|---|
| 2,403,628 | 7/1946 | Beers. |
| 2,472,165 | 6/1949 | Mankin. |
| 2,838,600 | 6/1958 | Salinger. |
| 2,964,590 | 12/1960 | Gillette. |

ROBERT L. GRIFFIN, *Primary Examiner.*

ROBERT L. RICHARDSON, *Assistant Examiner.*

U.S. Cl. X.R.

178—7.92; 315—30, 31